United States Patent
Matsuno et al.

Patent Number: 5,109,041
Date of Patent: Apr. 28, 1992

[54] PRODUCING METHOD FOR ASPHALT MIXTURE

[76] Inventors: Saburo Matsuno, 7-11, Minaminagareyama 4-chome, Nagareyama-shi, Chiba-ken; Yasuhisa Taguchi, c/o Technical Laboratory Sato Road Co., Ltd. 47-3, Mita, Atsugi-shi, Kanagawa-ken, both of Japan

[21] Appl. No.: 664,360

[22] Filed: Mar. 4, 1991

[30] Foreign Application Priority Data

Mar. 7, 1990 [JP] Japan ............ 2-53536
May 24, 1990 [JP] Japan ............ 2-132549

[51] Int. Cl.⁵ .................... C08L 95/00
[52] U.S. Cl. .................... 524/62; 524/60; 524/71; 106/281.1; 106/282; 106/283
[58] Field of Search ......... 106/281.1, 282, 283; 524/60, 62, 71

[56] References Cited

U.S. PATENT DOCUMENTS

3,778,397 12/1973 Gannon et al. ............ 524/60
4,523,957 6/1988 Graf et al. ............ 524/60

*Primary Examiner*—Paul R. Michl
*Assistant Examiner*—Edward Cain

[57] ABSTRACT

A method for producing an asphalt mixture using single particle-size aggregate whose weight ratio passed through a sieve having the size of mesh of 2.36 mm is lower than 15% comprising the steps of: (1) adding foamed surface active agent of 1.0 to 30.0% in its weight ratio to asphalt to the asphalt and aggregate which are mixed in a mixer of an asphalt plant or (2) adding rubber latex of 6 to 30% in its weight ratio to pure asphalt, and adjusting the quantity of the asphalt containing rubber so as to exceed 5.5% and stay below 8.0% in its weight ratio to the asphalt mixture and forming the asphalt containing rubber on the surface of the aggregate.

3 Claims, 2 Drawing Sheets

PRODUCING METHOD FOR ASPHALT MIXTURE

BACKGROUND OF THE INVENTION

1. Field of the Invention

The present invention relates to a method of producing an asphalt mixture using a so-called single particle-size aggregate with the percentage thereof passing through a sieve having a mesh size of 2.36 mm being lower than 15% in weight and more particularly to a producing method for an asphalt mixture containing a larger amount of asphalt.

2. Description of the Prior Art

The use of asphalt pavement has rapidly and widely spread in cities in recent times. However, since most asphalt pavements have no water permeability or water retentivity, a hydroplaning phenomenon occurs between the tires of a running vehicle and the road when the road surface is wet which may have a very bad influence on the operation of the vehicle. Further, when it rains, the draining capabilities of such pavements may deteriorate. Still further, in very heavy rain, if the capacity of the drainage system is exceded local flooding may occur since the rain water cannot seep into the ground.

As a result of the above, attention has recently been directed to asphalt pavements having water permeability as one means for solving the above discussed problems.

The material and the mixing rate design of asphalt mixtures used in Japan are based on the "Outline of Asphalt Pavement" issued by the Japan Road Association (hereinafter referred to as "Outline"). In this Outline, a permeable pavement is disclosed as a special pavement wherein the percentage of voids is set to a value higher than 12%. However, with a percentage of voids of about 12%, water permeability sufficient to overcome the above mentioned problems cannot be obtained.

The percentage of voids in an asphalt mixture sufficient to provide a water permeability to overcome the above problems can be expected to be higher than approximately 18% based on current experience. Asphalt mixtures whose percentage of voids are higher than 18% are in the course of being designed and used on road-ways of Europe and the U.S.A. Although such asphalt pavements have a higher percentage of voids than conventional permeable pavement and also has higher water permeability, they are not durable because of the high percentage of voids, and therefore roads that are paved therewith have short lives.

Generally, in order to prepare a mixture whose percentage of voids is higher than 18%, a large quantity of rough aggregate which cannot pass through a sieve having the size of a mesh of 2.36 mm has to be blended. Specifically, a so-called single particle-size aggregate whose weight percentage passing through the sieve is lower than 15% may preferably be used. Since the above described mixture deteriorates substantially more due to air, ultraviolet rays, wind and rain than a mixture with a weight percentage passing through a sieve having the size of a mesh of 2.36 mm being higher than approximately 25% (having no water permeability and refered to as "ordinary mixture" hereafter), it is poor in durability. To solve this problem, as large as possible a quantity of asphalt has to be added into the mixture and the asphalt coating on the surface of the aggregate material has to be thickened.

However, according to a conventional method, the quantity of asphalt which can be added into the mixture of a single particle-size paving mixture using common and natural crushed stone without draining or running off, is up to about 5% in its weight ratio to the mixture. Such a percentage of asphalt however does not provide a sufficient quantity of asphalt to prevent the above mentioned deterioration due to natural phenomena.

In mixing the asphalt and the aggregate according to the conventional mixing method, a technique is used wherein the asphalt is heated to a temperature at which a proper viscosity (180±20 cst to kinematic viscosity) can be obtained and then it is mixed with the aggregate in order to make the mixing easy.

According to this method, when a mixture having single particle-size is mixed with asphalt of a weight ratio of 6.0 to 8.0%, a part of the asphalt cannot cling onto the surface of the aggregate, particularly onto the surface of rough aggregate, and instead runs off and falls together with fine aggregate from the surface of the rough aggregate. As a result, only a quantity of asphalt corresponding to approximately 5.0% remains. The reason for this is that in the case of a mixture using a single particle-size aggregate the amount of fine aggregate which is interposed between the asphalt and the rough aggregate and can serve to link them, is low. That is, in order to make the asphalt stay in the mixture of the single particle-size which contains little fine aggregate, a higher viscosity asphalt is required than that of the asphalt which may be used when the ordinary mixture is mixed. Thus, at present, when asphalt is added into the single particle-size mixture containing only little fine aggregate, the mixing processing is carried out at a lower temperature (in the U.S.A., 107°–127° C. corresponding to 700–900 cst of kinematic viscosity in the asphalt) than that in the prior art.

Although this mixing method enables a mix of approximately 6% asphalt, the mixture is produced and shipped at a lowered temperature so that various shortcomings appear when the road is paved with the asphalt mixture, or in its use as an asphalt pavement. In the first place, since the load of the mixer for the asphalt plant increases, an excess current is apt to be generated or the blades of the mixer are possibly broken in the worst case. In the second place, the temperature of the mixture is lowered and therefore, the mixture grows heavier than an ordinary one, so that it becomes more difficult to evenly lay the mixture by an asphalt finisher in the field (finishability) and the simplicity of the operation for evenly laying the mixture b workers (workability) is significantly deteriorated. In the third place, the compaction effect of the low temperature mixture is damaged owing to a decrease in binding power of the asphalt in view of the characteristic of the mixture. Compaction density, which is the most essential and important feature for the asphalt pavement after the mixture is paved, is not secured. The durability and weather resistance of the mixture paved at such a low temperature deteriorates and thereby causes the cycle for maintenance and repair thereof to be shortened, which results in economical loss over a long period.

SUMMARY OF THE INVENTION

To cope with the above mentioned drawbacks, it is an object of the present invention is to provide a method for producing an asphalt mixture with weather resistance, durability and water permeability by means of mixing a quantity of asphalt exceeding the normal rate of the conventional mixture, into a mixture using so-called single particle-size aggregate without running off and falling.

In accordance with the present invention a method for producing an asphalt mixture using aggregate of a single particle-size is provided wherein a foamed surface active agent of specifically 1.0 to 30.0% in its weight ratio to asphalt is charged to the asphalt and aggregate which are mixed in a mixer of the asphalt plant. It was recognized that as a result, a quantity of asphalt more than the conventional amount could be added into the mixture, and a mixture having single particle-size higher in utility and larger in the percentage of voids could be produced.

It was further found that when a surface active agent is so charged, it contributes to improving the rate of the mixture of the asphalt when any kind of the rough aggregate is used. It is assumed that running off and falling phenomenon can be prevented because, by addition of the foamed surface active agent, a surface effect is developed on the surface of the aggregate which increases adhesion of the asphalt thereto and further, the formed foams hold the asphalt on the surface of the aggregate.

When a powdered or granulated modified asphalt additive is added after the foamed surface active agent is charged, the modified asphalt adheres to the aggregate without running off, so that the modifying effect of the additive is even further exhibited.

As the asphalt, any one of straight asphalt, semi-blown asphalt, rubber type modified asphalt, resin type modified asphalt and rubber resin type modified asphalt, which have been generally used in Japan, may be used.

The present invention is basically different from the concept of the conventional foamed asphalt for producing an asphalt mixture comprising the steps of charging steam or water under pressure into heated asphalt to foam the asphalt and then injecting it to a mixer to thus produce a mixture containing a much more finely granulated content. According to the present invention, water is not previously charged under pressure into the asphalt to foam it before it is mixed with aggregate. In the present invention, a foamed surface active agent is charged and mixed into asphalt and aggregate which are mixed in the mixer of an asphalt plant, which causes a surface action to occur on the surface of the aggregate, the surface tension of the asphalt is lowered and the adhesion thereof to the aggregate is increased. As a result a thicker asphalt coating can be formed on the surface of the rough aggregate than that formed according to the conventional method.

The use of a surface active agent has been well known in the U.S.A. However, it is not a foamed surface active agent but a liquid type surface active agent which is used to prevent separation between the asphalt and the aggregate in the asphalt mixture and accordingly the use thereof is based on an absolutely different technical concept. Further, in the prior art the surface active agent is employed by adding 0.3 to 0.5% in its weight ratio to the asphalt when the asphalt is transferred from a tank lorry to an asphalt kettle in the asphalt plant and is not charged into the mixer of the asphalt plant during the production of the asphalt mixture as in the present invention. Accordingly, the conditions for charging and mixing the surface active agent and the purposes for employing it are completely different between the prior art and the present invention.

Furthermore, the same effect can be obtained when an asphalt mixture is produced as follows: 6 to 30% by weight of rubber latex containing solid rubber, relative to the weight of pure asphalt, is added to the mixture of the pure asphalt and aggregate which is mixed in the mixer of an asphalt plant. The rubber latex has a solid rubber content between 50% and 66.7% by weight. Therefore, the amount of the added solid rubber is 3 to 20% by weight, relative to the weight of the pure asphalt. The total weight of the pure asphalt and the solid rubber exceeds more than 5.5% by weight and stays below 8.0% by weight, relative to the asphalt mixture of the pure asphalt, aggregate and rubber latex. If the asphalt mixture is used, a thicker asphalt coating can be formed on the surface of the aggregate.

It is assumed that running off and falling phenomenon can be prevented because, by addition of rubber latex, foams are formed in the mixture and the asphalt is held on the surface of the aggregate by the action of the stabilizer, surface active agent and water content in the latex and further, a surface effect acts on the asphalt to increase adhesion.

As a method for mixing rubber latex, besides the plant mixing method described above, a premixing method may be used. However, since the latex does not foam in premixed type asphalt containing rubber, owing to having already dissolved the rubber in the asphalt, the running off and falling thereof cannot be prevented.

The mixture produced according to the method of the present invention can achieve the following significant improvements in performance in the processes of pavement and the use thereof.

Since the temperature of the mixture during mixing and paving, is substantially the same as that of the mixture in the conventional and ordinary pavement, the mixture can be easily prepared, workability in leveling and compaction is improved and a mixture having the density to be provided as an asphalt pavement can be produced.

The clinging of the asphalt on the surface of the aggregate is maintained and the quantity of the contained asphalt is increased more than that in the case of the ordinary mixture, so that the thickness of the asphalt coating formed on the surface of the aggregate is increased and resistance to deterioration due to air, ultraviolet rays, wind and rain is raised, thereby a mixture having excellent durability and weather resistance is obtained.

DETAILED DESCRIPTION OF THE INVENTION

(1) Experiment 1

Figure 1:
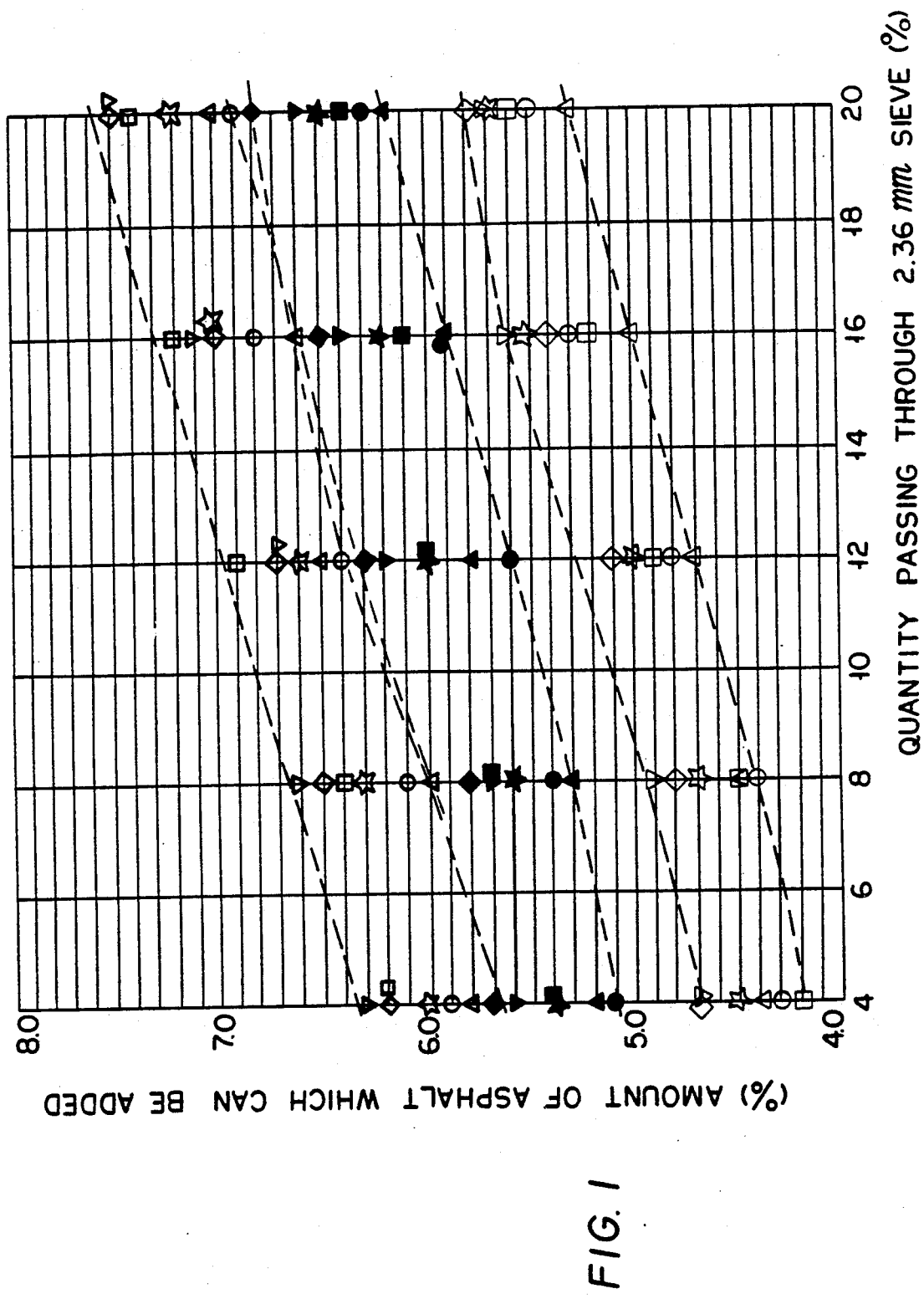
FIG. 1 is a graph showing the relationship between an obtained particle size and the amount of asphalt which can be added and FIG. 2 is a graph showing the relationship between the change in the amount of addition of surface active agent and rubber latex and the amount of rubber latex which can be added.

FIG. 1 shows the relation between the obtained particle size and the amount of asphalt which can be added in respect of rough aggregates of various kinds of materials. As asphalt, straight asphalt 60/80 was used.

A surface active agent, specifically a fatty amine, was first diluted in water with the ratio of the surface active agent to the water being 4 to 6. The obtained aqueous solution of the surface active agent was foamed by an agitator. The foamed solution was added to the mixture of pure asphalt and aggregate in an amount of 20% by weight, relative to the pure asphalt, and mixed at a temperature of 160° C. This procedure was carried out repeatedly, with the proviso that the amount of the pure asphalt is increased by increments of 0.1%, relative to the initial be included without causing the aggregate to drain (runoff) was recognized by visual observation.

Similarly, rubber latex of 5% in conversion of the quantity of solid rubber was added and an experiment was carried out.

The compounding ratio of aggregate and the kinds of used rough aggregate in this experiment are shown in the following Table.

TABLE 1

| Kind of aggregate | S-6 | Fine Sand | Stone powder |
|---|---|---|---|
| Compounding ratio (%) | 88 | 8 | 4 |

TABLE 2

| Legend and Physical Property of Rough Aggregate (S-6) | | | | | |
|---|---|---|---|---|---|
| non-addition | addition of surface active agent | addition of latex | material of rough aggregate | specific gravity | amount of water absorption (%) |
| ○ | ● | ⊛ | amphibolite | 2.859 | 0.65 |
| △ | ▲ | ▲ | diabase | 2.867 | 0.88 |
| □ | ■ | ▣ | sand stone | 2.680 | 1.17 |
| ☆ | ✶ | ✭ | crushed stone | 2.706 | 1.24 |
| ▽ | ▼ | ▼ | limestone | 2.707 | 1.35 |
| ◇ | ◆ | ⊛ | andesite | 2.718 | 1.82 |

When the mixture is prepared according to a mixing method of the present invention, any aggregate, with the addition of surface active agent, enables the amount of asphalt to be added by 1.0 to 2.0% more than that according to the conventional mixing method at an ordinary mixing temperature and, with the addition of rubber latex, it enables the amount of asphalt to be added by 1.5 to 2.0% more than that.

(2) Experiment 2

Figure 2:
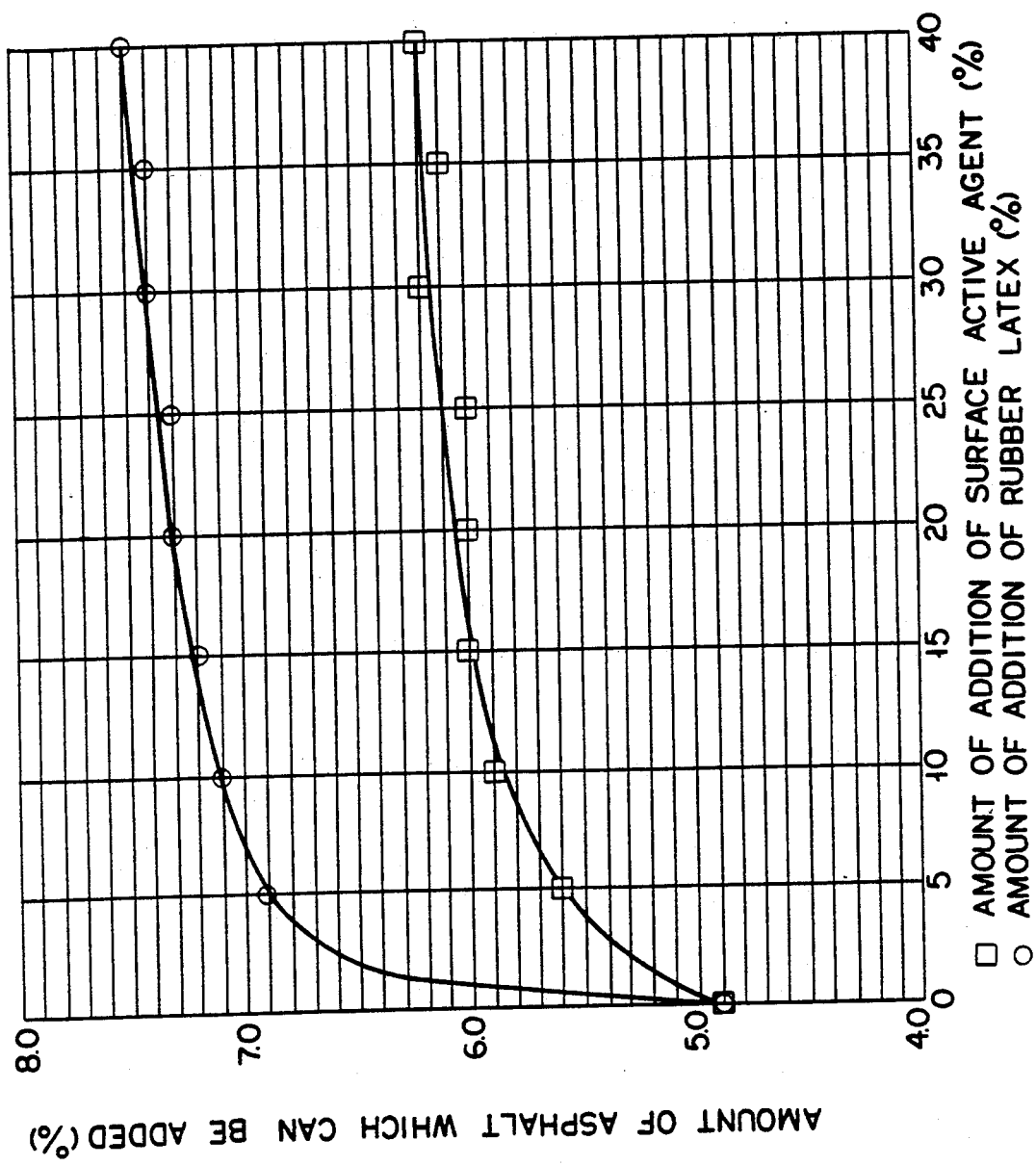

FIG. 2 shows the amount of asphalt which can be added without running off the aggregate when the amount of addition of surface active agent or rubber latex is changed with the composed particle size of aggregate fixed. Mixing conditions are the same as those of the Experiment 1. From this Experiment, it is recognized that the addition of 5 to 30% of surface active agent or rubber latex preferably effects the prevention for sagging of asphalt.

TABLE 3

| Kind of aggregate | Compounding ratio | | |
|---|---|---|---|
| | S-6 | Fine Sand | Stone powder |
| Compounding ratio (%) | 88 | 8 | 4 |

TABLE 4

| | Composed particle size | | | | | |
|---|---|---|---|---|---|---|
| | Size of mesh of sieve (mm) | | | | | |
| | 13 | 5 | 2.5 | 0.6 | 0.3 | 0.15 | 0.075 |
| Composed particle size (%) | 100 | 12.7 | 12.0 | 10.5 | 10.1 | 4.9 | 3.7 |

TABLE 5

| Physical property of rough aggregate (S-6) | | |
|---|---|---|
| Material of rough aggregate | Specific gravity | Amount of water absorption (%) |
| Sand stone | 2.680 | 1.17 |

What is claimed is:

1. A method for producing an asphalt mixture using a single particle-size aggregate the percentage of which passing through a sieve having a mesh size of 2.36 mm is lower than 15% by weight, comprising the steps of:
   a) preparing a mixture of pure asphalt and aggregate in a mixer of an asphalt plant,
   b) preparing a solution of a surface active agent,
   c) foaming the solution of the surface active agent, and
   d) adding 1.0 to 30.0% by weight of the foamed solution, relative to the pure asphalt, to the mixture of the pure asphalt and the aggregate.

2. A method for producing an asphalt mixture using a single particle-size aggregate the percentage of which passing through a sieve having a mesh size of 2.36 mm is lower than 15% by weight, comprising the steps of:
   a) preparing a mixture of pure asphalt and aggregate in a mixer of an asphalt plant,
   b) adding 6 to 30% by weight relative tot he weight of the pure asphalt of rubber latex including solid rubber to the mixture of the asphalt and the aggregate so that the total weight of the pure asphalt and the solid rubber exceeds more than 5.5% by weight and stays below 8.0% by weight, relative to the asphalt mixture of the pure asphalt, aggregate and rubber latex, and
   c) forming the asphalt containing said solid rubber on the surface of the aggregate.

3. The method in accordance with claim 1 wherein said foamed surface active agent comprises a fatty amine.

* * * * *